United States Patent [19]

Curtin et al.

[11] Patent Number: 4,674,116
[45] Date of Patent: Jun. 16, 1987

[54] TELEPHONE LINE CONCENTRATOR WITHOUT SWITCHING MATRIX

[75] Inventors: William J. Curtin, Madison, Wis.; Cedric Adams, Glenview, Ill.; Stephen H. Soto, Madison, Wis.

[73] Assignee: Amtelco, Madison, Wis.

[21] Appl. No.: 751,535

[22] Filed: Jul. 3, 1985

[51] Int. Cl.⁴ .............................. H04M 3/54
[52] U.S. Cl. ................................ 379/211; 379/214
[58] Field of Search .......... 179/18 AD, 90 B, 90 BB, 179/90 BD, 99 R, 99 LC, 18 BE, 18 B, 84 C, 6.17, 6.13, 6.16

[56] References Cited

U.S. PATENT DOCUMENTS

| 3,867,582 | 2/1975 | Weed et al. | 179/18 BE |
| 3,963,875 | 6/1976 | Gveldenpfennig | 179/18 BE X |
| 4,484,031 | 11/1984 | Gray et al. | 179/18 BE |
| 4,582,957 | 4/1986 | Hayes et al. | 179/18 BE |

Primary Examiner—James L. Dwyer
Attorney, Agent, or Firm—Robert E. LeBlanc

[57] ABSTRACT

Apparatus for use in conjunction with a PBX system and a telephone answering system is disclosed in which line scanners are used to detect the presence of ring signals on each of the extension lines within the PBX system and to determine when the number of such ring signals on a monitored line exceeds a predetermined limit. A computer coupled to each of the line scanners, upon determining that the predetermined limit has been exceeded, actuates automatic dialing circuitry, which is connected to both the PBX and telephone answering systems, to dial the PBX system and cause it to carry out a directed call pick-up of the incoming call. Simultaneously, the automatic dialing system dials the telephone answering system on a different telephone line. The computer then controls the automatic dialing circuitry to couple the incoming call to the telephone answering system without the incoming call having been answered.

25 Claims, 5 Drawing Figures

TELEPHONE LINE CONCENTRATOR WITHOUT SWITCHING MATRIX

BACKGROUND OF THE INVENTION

The present invention relates generally to apparatus for use with telephone PBX systems. More particularly, the present invention relates to a telephone line concentrator without a switching matrix (TABX) for use in conjunction with a PBX system for monitoring the various telephone extensions within the PBX system and instructing the PBX to answer the call by means of a remotely located telephone answering service.

In telephone PBX systems, it is desirable to provide telephone answering services for each of the various telephone extensions within the system such that incoming telephone calls can be answered and provision made for responding thereto. That is especially true where an incoming call remains unanswered, indicating that the called individual is not available to answer the extension.

In the past, in order to provide each of the telephone extensions of a PBX system with telephone answering services (TAS), the telephone answering service was connected across both the tip and ring lines and had no connection whatsoever to the PBX.

In another device, described in commonly assigned U.S. patent application Ser. No. 06/599,715 entitled "Telephone Answering System With Line Detector," a control system has been interconnected between the PBX system and each of the telephone extension lines. That control system is connected in parallel across the tip and ring lines directed to each extension line. The control system monitors each of the incoming calls received on the telephone extension lines and uses the PBX/Centrex switching matrix for connecting a local operator-controlled telephone answering system to the tip and ring lines of such an extension, when that extension remains unanswered for a predetermined number The present invention, on the other hand, while also being connected in parallel across the tip and ring lines, again uses the PBX/Centrex switching matrix (instead of its own switching matrix) but interfaces to a *nonlocal* (*remote*) operator-controlled telephone answering system.

In operation, the TABX is connected across each of the extension lines in the PBX system and counts the number of rings on each respective extension line therein. When a telephone rings more than a predetermined number of times, the TABX of the present invention instructs the PBX to perform a directed call pick-up by means of its connection to the PBX. That results in the call currently ringing on that particular extension being placed on the line connecting the TABX to the PBX. At the same time, the TABX goes off-hook and dials a DID number on another line connected to the telephone company (Telco). Once the dialing is completed, the TABX connects the voice path represented by its line to the PBX to the line to the Telco. This allows the operator controlled telephone answering system to be remote.

Since the present TABX is designed to facilitate the operation of a telephone answering service with a PBX, the DID number it dials to the Telco would desirably be a unique number to the telephone answering service. That telephone answering system may be located either locally or remotely from the TABX. It may also be a corporate message center or the message center for a building.

Unlike existing telephone line concentrators, the invention does not need to have its own switching matrix. Instead, it uses a novel combination of hardware and software in order to utilize the switching matrix of the PBX. In addition, rather than being connected to the input side of the PBX, the instant invention is connected to the output side of the PBX, namely, to each of the various telephone extensions within the PBX system. Further, unlike a conventional line concentrator, the TABX is able to use "dial-up" rather than dedicated telephone lines for remote voice paths. Such novel combination of features offers substantial cost savings over prior art telephone line concentrators. Further, since the TABX uses a telephone line ring scanning hardware device which itself is connected in parallel across the tip and ring lines of each of the various telephone extensions within the PBX system, it is only necessary to add an additional line ring scanner for each of the various telephone extensions in order to cover all of the many (sometimes several hundred) telephone extension lines within a PBX system.

SUMMARY AND OBJECTS OF THE INVENTION

In view of the foregoing, it should be apparent that there still exists a need in the art for a new and improved apparatus for monitoring the various telephone extensions within a PBX system and for connecting any of such extensions which remain unanswered for a predetermined number of rings to a telephone answering system. It is, therefore, a primary object of this invention to provide apparatus for accomplishing that function which is characterized by simple electronic circuitry and which has particular application for use with existing telephone answering equipment.

More particularly, it is an object of the present invention to provide a TABX for use in conjunction with a PBX system in which the switching matrix of the PBX itself is utilized, thus eliminating the need for such a switching matrix within the present TABX.

Still more particularly, it is an object of the present invention to provide a TABX for use in conjunction with a PBX system which monitors the ring count and hook condition of each of the telephone extension lines within the PBX system and enables calls directed to such extension lines to be answered by directing the PBX system itself to fetch the ringing line, by means of the directed call pick-up feature incorporated within a PBX.

Another object of the present invention is to provide a TABX for use in conjunction with a PBX system which is reliable and relatively inexpensive to manufacture.

Briefly described, these and other objects of the invention are accomplished using a scanning device for monitoring each of the telephone extension lines within the PBX system. This scanner would normally be located at the site of the PBX system, while the telephone answering service or other message service which is ultimately connected to the unanswered PBX extension line may be situated at a location remote from the PBX system.

The TABX disclosed herein is designed for use in conjunction with both a PBX system and a telephone answering system and comprises a line scanning device for monitoring incoming calls on the telephone lines within the PBX system. The line scanning device includes a plurality of detecting devices, each connected in parallel across a respective one of the monitored telephone lines in the PBX system for detecting ring signals on those telephone lines. A computer is coupled to each of the plurality of detecting devices for counting the number of detected ring signals on each monitored line and for determining if that number of ring signals exceeds a predetermined limit. A coupling device is connected to both the PBX and the telephone answering systems, and is controlled by the computer to dial the PBX system and cause it to carry out a directed call pick-up of the incoming call on the monitored line when the number of rings exceeds the predetermined limit. The coupling device is also instructed to simultaneously dial the telephone answering service using a different telephone line. The computer device is also operative to further control the coupling device to cause it to connect the incoming call to the telephone answering service without the incoming call having been answered.

In its method aspects, a method of connecting an unanswered incoming call to a telephone answering system for use in conjunction with a PBX system is disclosed which comprises the steps of monitoring the incoming calls on the telephone lines within the PBX system and detecting ring signals on those monitored lines, counting the number of detected ring signals on each monitored line for determining when the number of ring signals exceeds a predetermined limit, dialing the PBX system and causing it to carry out a directed call pick-up of the incoming call on the monitored line when the number of rings on that monitored line exceeds the predetermined limit while simultaneously dialing the telephone answering system using a different telephone line and then coupling the incoming call to the telephone answering system without having answered the incoming call.

The scanner is connected in parallel across the tip and ring lines of each extension line and provides a means for interfacing the electrical activity occurring on the extension line to the microprocessor circuitry used to control the instant invention. The present TABX, unlike prior art telephone line concentrators, does not utilize an internal switching matrix and does not actually answer the call directly on the particular telephone extension line. However, the instant invention does function to direct the PBX to capture the line, although, as will be described hereinafter, the PBX itself does not actually answer the telephone extension line either.

The utilization of the internal switching matrix of the PBX and its elimination from the circuitry of the TABX serves to remove a substantial hardware cost from the TABX, and thus from the combination PBX, TABX and telephone answering system, while still enabling efficient telephone answering services to be provided.

The ring scanner that provides the means for interfacing the control microprocessor element to the telephone extension lines within the PBX system can detect the presence of a valid ring signal on the telephone line being monitored. A valid ring is defined as the presence of a ring voltage (greater than 40 VAC, 15-60 Hz) for at least 150 milliseconds and the absence of ring voltage for at least 550 milliseconds.

Once the scanner determines that a telephone on an extension line has rung more than a predetermined number of times, the instant invention causes the PBX to perform a directed call pick-up by means of its connection to the PBX. Such a PBX feature allows a station line to receive a call for another ringing extension by going off-hook, dialing a feature code, and then dialing the ringing extension number. The TABX functions to call the PBX and cause it to capture the call currently ringing on the extension line detected by the scanner.

At the same time, the TABX goes off-hook and dials a DID number on a separate phone line from the telephone company. Once the dialing is completed, the instant invention connects the voice path between the number it has just dialed and the PBX. The DID number dialed by the TABX can be connected to a telephone answering service, a corporate message center or the message center for a building. In that manner, a PBX extension line that has rung more than a predetermined number of times is answered by a telephone answering service or operator, either local to or remote from the PBX and the TABX of the instant invention.

In another embodiment, the TABX can go off-hook on a dedicated line to reach a telephone answering service. The telephone answering service equipment can auto-answer and then return a dial tone. The unique identity of the PBX extension detected by the TABX circuitry can be communicated in tones prior to connecting the voice path of the call from the PBX to the telephone answering service. In such a manner, the identity of the extension line can be automatically recorded, together with the incoming message.

DETAILED DESCRIPTION OF THE PREFERRED EMBODIMENT

Figure 1:
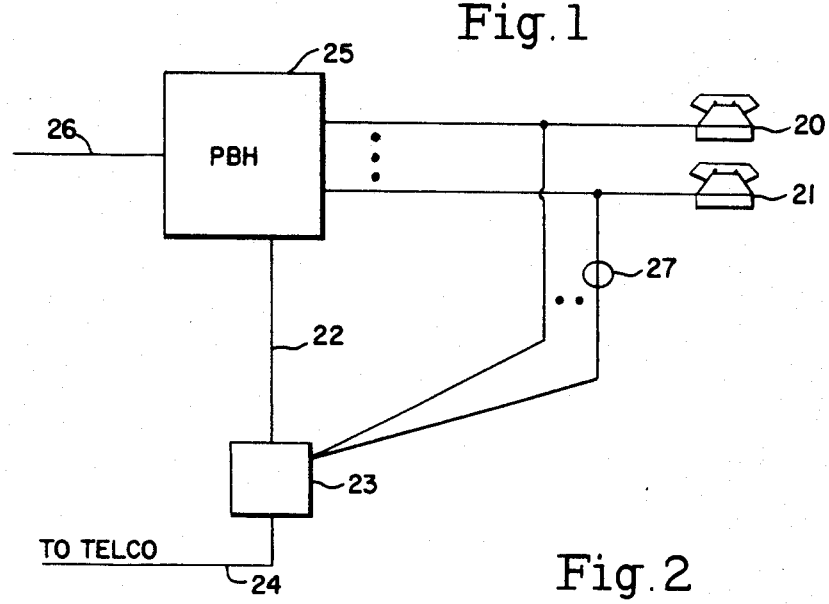
FIG. 1 is a block diagram showing the connection of the present TABX to the extension lines of a PBX.

Referring now in detail to the drawings wherein like parts are designated by like reference numerals throughout, there is illustrated in FIG. 1 the use of the present TABX 23 in conjunction with a PBX 25 and two extension lines 20 and 21. It should be understood that each of the extension lines 20 and 21 consist of a tip and a ring line, which is common practice. A plurality of trunk lines 26 connect the PBX to the telephone company network.

The TABX is connected to one or more tip and ring extension lines to be scanned by scanner 27. It should be understood that scanner 27 is connected in parallel such that the scanner or ring detector circuit 27, as shown, for example, in FIG. 2, can sense ringing on the extension line.

The TABX 23 is also connected to the PBX by one or more normal PBX phone extension tip and ring lines, such as shown as line 22 in FIG. 1. The TABX 23 is also connected by a line 24 to a telephone company phone line.

In operation, when a phone such as the one connected to extension line 20 rings more than a predetermined number of times, the ringing sensed by the scanner 27 causes the instant TABX 23 to instruct the PBX to perform a directed call pick-up by transmitting information on line 22 to the PBX. That causes the call currently ringing on extension line 20 to appear on line 22. At the same time, the TABX 23 goes off-hook and dials a DID number on line 24 to, for example, a telephone answering service. Once the dialing has been completed, the instant TABX 23 connects a voice path from line 22 to line 24, thus allowing the telephone answering service to answer the unanswered call which had originally been ringing on PBX extension line 20.

Figure 2:
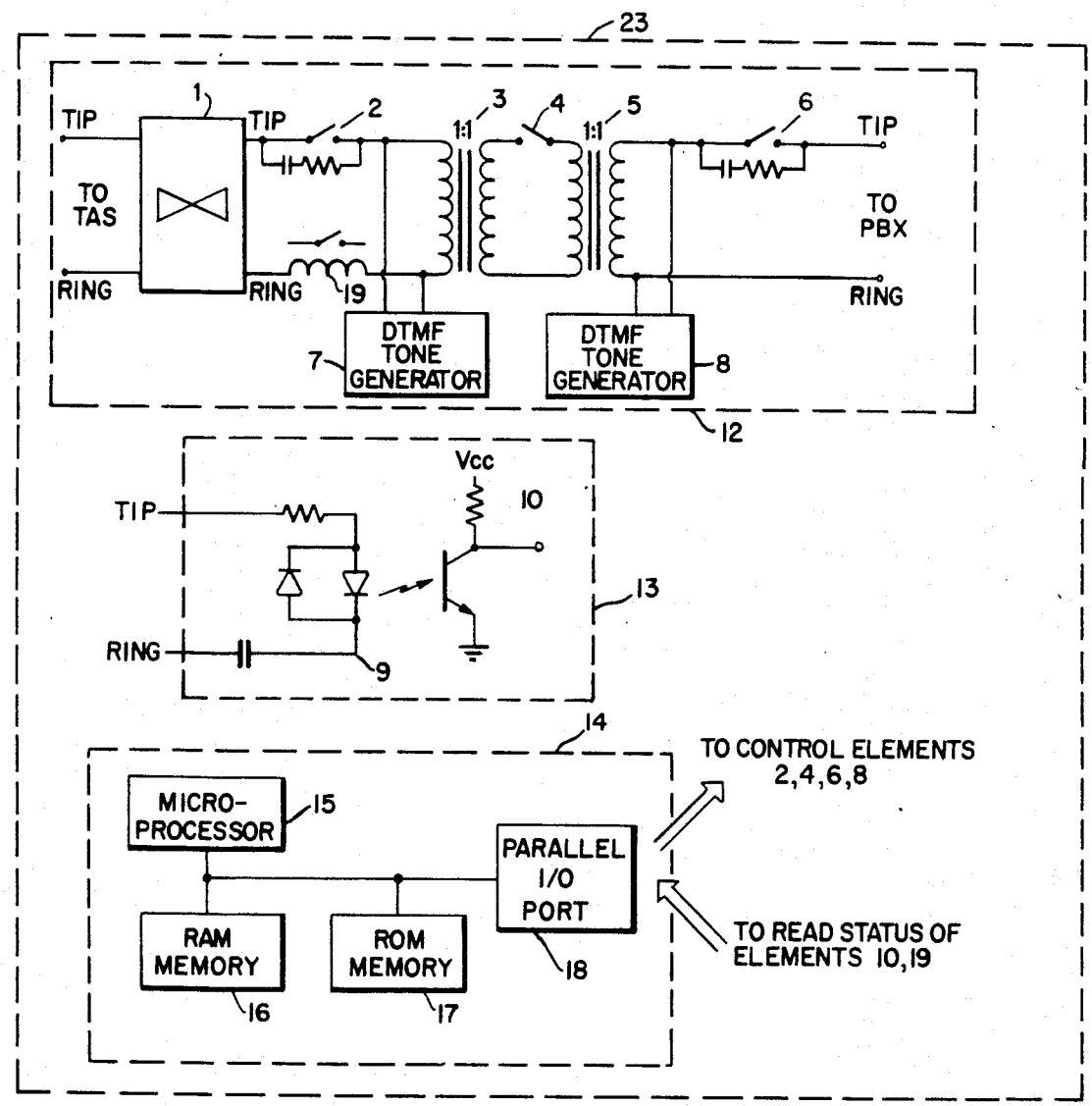
FIG. 2 is a schematic block diagram of the present TABX.

Referring now to FIG. 2, the various components which comprise the telephone line scanner or ring detector circuit 27 are shown in schematic block diagram form. The scanner 27 includes circuitry which is connected across each tip end ring extension line and includes an opto-coupler 9 for isolation purposes. The opto-coupler 9 may comprise a 4N33 transistor.

The voltage produced on line 10, which is connected to the output of the opto-coupler 9, is read by means of parallel input/output port 18 and then fed to a microprocessor 15.

The microprocessor 15, which may be a Z80 device, is connected via an appropriate bus to a RAM memory 16, which may be a 6264, a ROM memory 17, which may be a 2716 EPROM and, as already indicated above, to the parallel input/output port 18. The parallel input/output port 18 may consist of a plurality of 74L541 integrated circuits for use as input gates and UCN-4801 integrated circuits for use as output latches. As is standard with Z80 microprocessors, clocking, power-up reset, bus control, addressing and data control circuitry are included within the Z80 microprocessor chip.

The telephone dialer 12, which is controlled by the microprocessor circuitry 14 to perform various dialing functions, is also shown in FIG. 2. That dialing circuitry 12 comprises a voice line repeater 1 which is connected to the tip and ring lines of the telephone answering service. The voice line repeater 1, which may, for example, be an R-TEC 1050 two voice gain repeater, provides the necessary amplification to the circuit which is ultimately formed by connection of the line 22 from the PBX to the line 24 which may be connected to the telephone answering service (TAS). The TAS may be remotely located from the PBX 25 and TABX 23.

Voice line repeater 1 is also connected to internal tip and ring lines which ultimately connect to the tip and ring lines which comprise line 22, which is connected to the PBX. The tip line includes a relay 2 which allows the TABX 23 to go off-hook and send dial pulses or tones to the telephone company or TAS system via the hardwire connection shown. Both the tip line and the ring line exiting from the voice line repeater 1 are connected to opposite sides of a transformer 3 which provides for electrical DC isolation between the PBX tip and ring lines.

The tip line also includes a relay 4 which connects the path from the PBX tip and ring lines to the telephone answering service or Telco tip and ring lines. The other side of the relay 4 is connected to one side of a second isolation transformer 5 which also provides electrical DC isolation between the PBX tip and ring lines. Between that transformer 5 which, like transformer 3, is coupled across the tip and ring lines between the PBX and the telephone answering service, is a relay 6, which allows the TABX 23 to go off-hook so that it can send dial pulses or tones to the PBX 25. In that regard, a dual tone multifrequency tone generator 8 is connected across the tip and ring lines leading to the PBX, between the transformer 5 and the relay 6, for the purpose of generating dial digits to the PBX. DTMF tone generator 8 dials the directed call pick-up to the PBX on line 22 when a ringing PBX phone extension line has rung more than the predetermined number of times.

A second dual tone mutifrequency tone generator 7 is connected across the tip and ring lines between the relay 2 and the isolation transformer 3 and performs a similar function as DTMF tone generator 8 with respect to calling the telephone answering service on line 24. Alternatively, DTMF tone generator 7 can dial digits to the Telco on line 24. It should be understood that relays 2, 4 and 6 and the two DTMF tone generators 7 and 8 are under direct control of the microprocessor circuitry 14. They are connected to the microprocessor 15 by means of the parallel input/output port 18.

Disconnect circuitry 19 is connected in series in the ring line between the voice line repeater 1 and the ring line side of the isolation transformer 3 for the purpose of detecting a disconnect. It may consist of simply a relay, or may be circuitry such as that shown in FIG. 3.

In operation, when the microprocessor 15 determines, via the parallel input/output port 18, that a plurality of ring voltages have appeared on line 10 for a predetermined period of time, it actuates relay 6 which allows the TABX 23 to go off-hook. Dial pulses are sent to the PBX via line 22 by means of relay 6. Alternatively, the first DTMF tone generator 8 can be used to send tone digits to the PBX.

Simultaneously, relay 2 is actuated to allow the TABX 23 to go off-hook with respect to the Telco or telephone answering service telephone line 24. Relay 2 can also be operated to dial pulses to the Telco or TAS system through the voice line repeater 1. Alternatively, the second DTMF tone generator 7 can send tone digits to the Telco or TAS system. When the TABX 23 has connected through line 22 to the PBX and through line 24 to the Telco or TAS, relay 4 is closed, by means of microprocessor circuitry 14, thus connecting the talk path between the PBX tip and ring lines and the TAS or Telco tip and ring lines.

Figure 4:
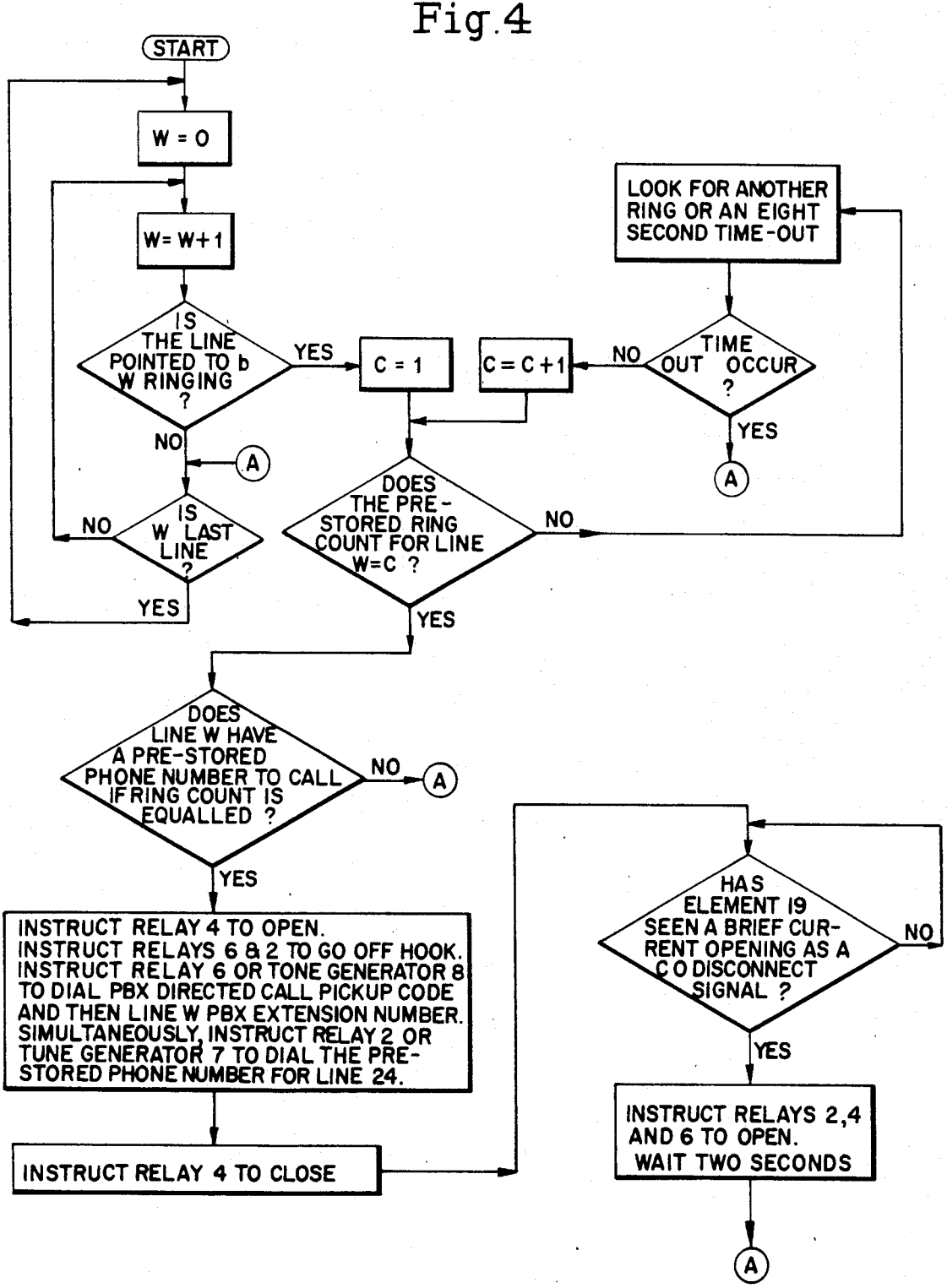
FIG. 4 is a flow chart showing the steps utilized by the TABX during its operation.

The microprocessor circuitry 14 is operated in accordance with programs stored in the ROM memory 17. A flow chart describing one program stored therein is set forth in FIG. 4. The microprocessor 15 runs the program contained in the ROM memory 17, while utilizing the RAM memory 16 for data storage purposes.

Briefly described, the programming contained in the ROM memory 17, upon starting, sets the line pointer to zero, then increments that line pointer by one. Next, a determination is made as to whether the line currently pointed to is ringing. If the line is not ringing, the determination of whether that line W is the last line is made. If that line W is not the last line, then the program returns to increment the line W by one and to determine whether that line is ringing. If W was the last line, the program returns to its initialization point, sets W to zero, and begins again.

In the event that the line pointed to by W was determined to be ringing, then the program sets a counter C equal to one and determines whether the pre-stored ring count for the line W equals the count C. If the answer to that determination is no, the program looks for another ring or an eight second time out. If that time out does occur, the program has determined that the incoming call is no longer unanswered and then jumps to determine whether the monitored line W was the last line. In the event that a time out has not occurred, the count C is incremented by one and the determination of whether C equals the pre-stored ring count for that monitored line is made again.

In the event that the pre-stored ring count for the line W being monitored is equal to the count C, the determination is made as to whether that line W has a pre-stored phone number to call if the ring count is equal. If not, the program returns to determine whether that line W was the last line.

In the event that there is a pre-stored phone number to call if the ring count is equalled, meaning that an unanswered incoming call has been detected and should be answered, relay 4 is instructed to open. Then, relays 6 and 2 are instructed to go off-hook and relay 6 or tone generator 8 is instructed to dial the PBX directed call pick-up code and then the line W PBX extension number. Simultaneously, the relay 2 or tone generator 7 is instructed to dial the pre-stored phone number for the line 24. Next, the relay 4 is instructed to close.

Finally, a determination is made as to whether element 19 has seen a brief current opening as a CO disconnect signal, meaning has the previously unanswered but now answered incoming call been terminated. If not, the program forms a continuous loop again making that same determination until a disconnect has been detected.

Upon determining that a disconnect of the previously unanswered incoming call has occurred, relays 2, 4 and 6 are opened and the program waits two seconds. The program then returns to determine whether that monitored line W was the last line.

Figure 3:
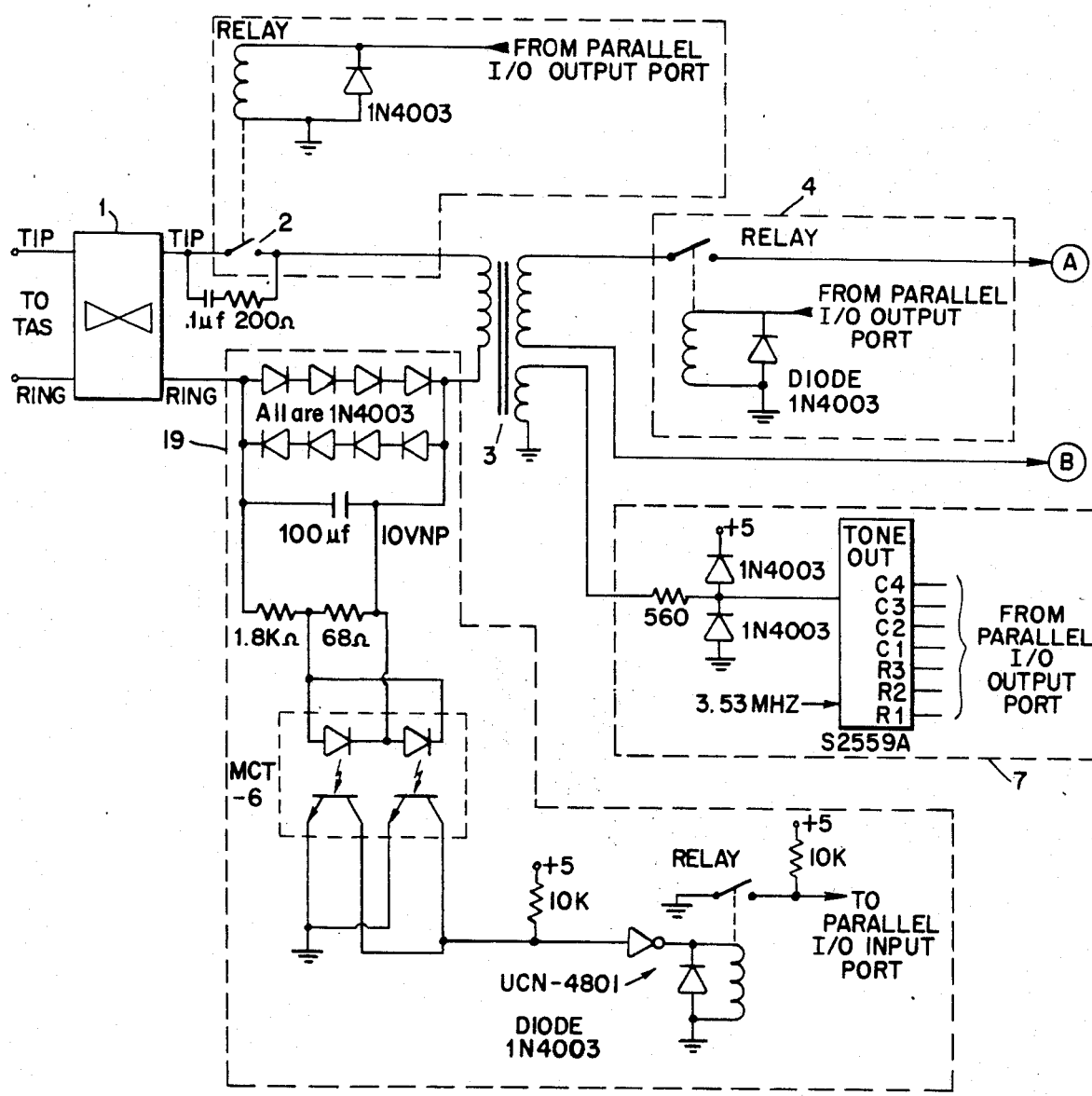
FIGS. 3 and 3A are a schematic block diagram of the dialing circuitry contained within the instant TABX.
Figure 3A:
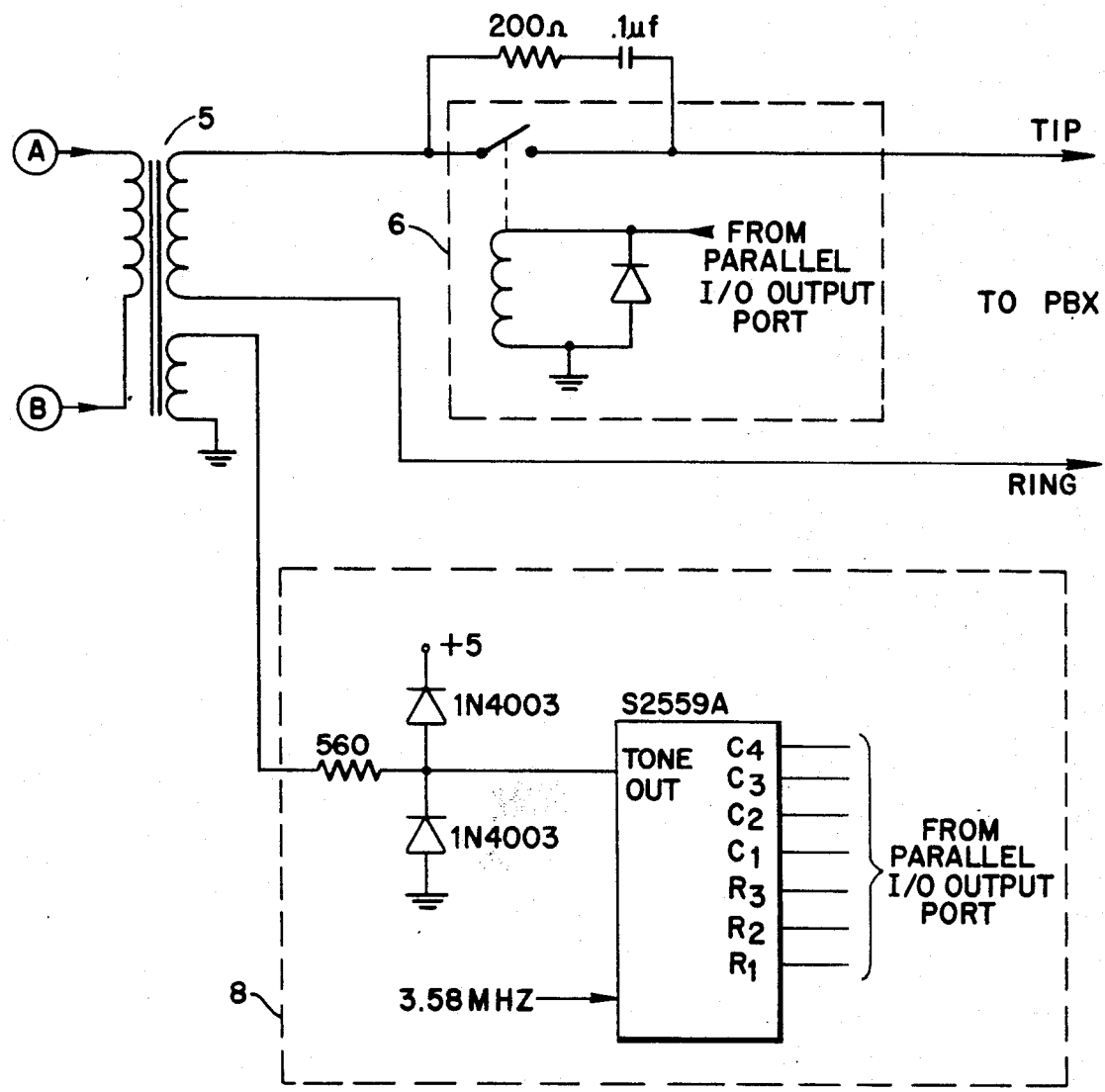

FIGS. 3 and 3A show the dialing circuitry 12 and its components in greater detail. Both of the isolation transformers 3 and 5 are 600 Ohm to 600 Ohm and 225 Ohm transformers in order to receive the DTMF tone input from the first and second DTMF tone generators, 8 and 7. Each of those tone generators is comprised of an S2559A IC device having 10 k Ohm pull-up resistors on each input terminal. Each of the input terminals is connected to the parallel input/output port 18. Both devices receive a 3.5 MHz clocking signal which is used to produce the DTMF tone output which is fed to the 225 Ohm portion of each respective isolation transformer 3 and 5.

As shown in FIG. 3, disconnect detector 19 may alternatively be embodied as a plurality of series connected 1N4003 diodes in the ring line between the voice line repeater 1 and the 600 Ohm side of the transformer 3. An additional plurality of series connected like diodes is connected in parallel across the first plurality of series connected diodes. A resistor and capacitor network is also utilized for connection between those two pluralities of parallelly-connected diodes and opto-couplers. The opto-couplers are connected between the resistor and capacitor network and the input/output port 18 by which means the status of the disconnect circuitry 19 is communicated to the microprocessor 15.

As also shown in FIG. 3, each of the relays 2 and 4 are connected to the parallel input/output port 18 for control by the microprocessor 15. A diode is connected between ground and the input line from the parallel input/output port, with its anode connected to ground. Both of those diodes may preferably be 1N4003 devices.

As shown in FIG. 3A, the relay 6 is connected to receive instructions from the parallel input/output port 18 in a like manner. In addition, an RC network is connected in parallel across the contacts of the relay 6, which contacts are connected in series with the tip line.

With the above-described TABX, at the same time as a portion of automatic dialing circuitry 12 fetches the ringing call, one of three different functions can be performed. Firstly, the TABX can instruct the automatic dialing circuitry 12 to go off-hook on a regular phone line and dial a unique DID number to the telephone answering service. That voice path is then connected with the call that was just fetched by the other portion of the automatic dialing circuitry 12.

Secondly, the automatic dialing circuitry 12 can be instructed to go off-hook on a regular telephone line and dial a single phone number for the TAS. The TAS equipment can then auto-answer and return a dial tone. The automatic dialing circuitry 12 will then send tones to the TAS equipment to convey the unique identity of the PBS extension line it just fetched. The automatic dialing circuitry 12 then connects that voice path with the call fetched by the other portion of automatic dialing circuitry 12.

Thirdly, the automatic dialing circuitry 12 can be instructed to go off-hook on a dedicated line to the TAS. The TAS equipment can then auto-answer and return a dial tone. The automatic dialing circuitry 12 will then send tones to convey the unique identity of the PBX extension line it just fetched. Then, the automatic dialing circuitry 12 connects the voice path to the TAS equipment with the call fetched by the other portion of its circuitry.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. Apparatus for use in conjunction with a PBX system and a telephone answering system, comprising:
   line scanning means for monitoring incoming calls on the telephone lines within the PBX system, said line scanning means including a plurality of detecting means each connected in parallel across a respective one of said monitored telephone lines in the PBX system for detecting ring signals on said telephone lines;
   computer means coupled to each of said plurality of detecting means for counting the number of detected ring signals on each monitored line and for determining if said number of ring signals exceeds a predetermined limit;
   coupling means connected to both said PBX and telephone answering systems, said coupling means being controlled by said computer means to dial said PBX system and cause it to carry out a directed call pick-up of said incoming call on said monitored line when said number of ring signals exceeds said predetermined limit and to simultaneously dial said telephone answering system using a different telephone line; and
   said computer means further controls said coupling means to cause it to connect said incoming call to said telephone answering system without said incoming call having been answered.

2. The apparatus of claim 1, wherein said detecting means includes opto-isolator means connected across the tip and ring lines of each telephone line being monitored.

3. The apparatus of claim 1, wherein said coupling means includes disconnect means connected in the ring line of a telephone line being monitored for determining when said incoming call connected to said telephone answering system has been disconnected.

4. The apparatus of claim 3, further including interface means connected between said computer means and said detecting and coupling means for enabling said coupling means to read information from said detecting means and said disconnect means and for transmitting control signals to said coupling means.

5. The apparatus of claim 1, wherein said coupling means includes a plurality of isolation means for providing electrical isolation between the tip and ring lines of said telephone answering system and said PBX system.

6. The apparatus of claim 1, wherein said coupling means includes separate means for dialing said telephone answering system and said PBX system, under control of said computer means.

7. The apparatus of claim 4, wherein said coupling means includes a plurality of isolation means for providing electrical isolation between the tip and ring lines of said telephone answering system and said PBX system.

8. The apparatus of claim 7, wherein said coupling means includes separate means for dialing said telephone answering system and said PBX system, under control of said computer means.

9. The apparatus of claim 8, wherein each of said separate means for dialing comprises relay means actuated by said computer means to produce a series of pulses.

10. The apparatus of claim 8, wherein each of said separate means for dialing comprises DTMF tone generator means actuated by said computer means to generate a series of tones.

11. The apparatus of claim 1, wherein said coupler means further comprises relay means controlled by said computer means for connecting the voice path between said PBX system and said telephone answering system.

12. The apparatus of claim 1, further including means for transmitting information identifying the monitored line on which said incoming call is detected to said telephone answering system.

13. A telephone system comprising:
a PBX having a plurality of extension telephone lines;
a telephone answering system;
line scanning means for monitoring incoming calls on the telephone lines within the PBX system, said line scanning means including a plurality of detecting means each connected in parallel across a respective one of said monitored telephone lines in the PBX system for detecting ring signals on said telephone lines;
counting means coupled to each of said plurality of detecting means for counting the number of detected ring signals on each monitored line and for determining if said number of ring signals exceeds a predetermined limit;
coupling means for connecting both said PBX and telephone answering systems, said coupling means being controlled by said counting means to cause said PBX system to carry out a directed call pick-up of said incoming call on said monitored line when said number of ring signals exceeds said predetermined limit and to simultaneously access said telephone answering system; and
computer means for controlling said coupling means to cause it to connect said incoming call to said telephone answering system without said incoming call having been answered.

14. The apparatus of claim 13, wherein said detecting means includes opto-isolator means connected across the tip and ring lines of each telephone line being monitored.

15. The apparatus of claim 13, wherein said coupling means includes disconnect means connected in the ring line of a telephone line being monitored for determining when said incoming call connected to said telephone answering system has been disconnected.

16. The apparatus of claim 13, wherein said coupling means includes a plurality of isolation means for providing electrical isolation between the tip and ring lines of said telephone answering system and said PBX system.

17. The apparatus of claim 13, wherein said coupling means includes separate means for dialing said telephone answering system and said PBX system, under control of said computer means.

18. The apparatus of claim 15, further including interface means connected between said computer means and said detecting and coupling means for enabling said coupling means to read information from said detecting means and said disconnect means and for transmitting control signals to said coupling means.

19. The apparatus of claim 17, wherein each of said separate means for dialing comprises relay means actuated by said computer means to produce a series of pulses.

20. The apparatus of claim 17, wherein each of said separate means for dialing comprises DTMF tone generator means actuated by said computer means to generate a series of tones.

21. The apparatus of claim 13, wherein said coupler means further comprises relay means controlled by said computer means for connecting the voice path between said PBX system and said telephone answering system.

22. The apparatus of claim 13, further including means for transmitting information identifying the monitored line on which said incoming call is detected to said telephone answering system.

23. A method of connecting an unanswered incoming call to a telephone answering system for use in conjunction with a PBX system, comprising the steps of:
monitoring incoming calls on the telephone lines within the PBX system and detecting ring signals on said monitored lines;
counting the number of detected ring signals on each monitored line for determining when said number of ring signals exceeds a predetermined limit;
dialing said PBX system and causing it to carry out a directed call pick-up of the incoming call on said monitored line when said number of rings exceeds said predetermined limit and simultaneously dialing said telephone answering system using a different telephone line; and
coupling said incoming call to said telephone answering system without said incoming call having been answered.

24. The method of claim 23, wherein said step of dialing said PBX and telephone answering systems includes instructing one of a switching means and a DTMF generator to dial said PBX and said telephone answering systems.

25. The method of claim 23, further including the step of transmitting information identifying the monitored line on which said incoming call is detected to said telephone answering system.

* * * * *